(12) United States Patent
Hsu

(10) Patent No.: US 6,913,274 B2
(45) Date of Patent: Jul. 5, 2005

(54) FENDER STRUCTURE FOR BICYCLES

(75) Inventor: Kuo-Chung Hsu, Changhua (TW)

(73) Assignee: Sunnywheel Industrial Co., Ltd., Changhua (TW)

( * ) Notice: Subject to any disclaimer, the term of this patent is extended or adjusted under 35 U.S.C. 154(b) by 56 days.

(21) Appl. No.: 10/438,834

(22) Filed: May 16, 2003

(65) Prior Publication Data

US 2004/0227323 A1 Nov. 18, 2004

(51) Int. Cl.⁷ .............................................. B62D 25/18
(52) U.S. Cl. ............................ 280/152.1; 280/152.3; 280/152.2
(58) Field of Search ..................... 280/152.1, 152.3, 280/152.2, 153.5, 852, 851, 848, 849, 850, 280/854, 855, 288.4, 156, 160; 403/97, 141, 403/142

(56) References Cited

U.S. PATENT DOCUMENTS

| 617,836 | A | * | 1/1899 | Peterson | 280/152.3 |
| 1,112,478 | A | * | 10/1914 | Roderick | 280/152.3 |
| 1,226,323 | A | * | 5/1917 | Fialkowski | 280/152.3 |
| 4,319,763 | A | * | 3/1982 | White | 280/152.3 |
| 5,275,427 | A | * | 1/1994 | Gasser | 280/152.3 |
| 5,322,311 | A | * | 6/1994 | Dunn | 280/152.1 |
| 5,899,473 | A | * | 5/1999 | Mackenzie | 280/152.3 |
| 5,954,354 | A | * | 9/1999 | Chung | 280/152.1 |
| 6,331,011 | B1 | * | 12/2001 | Feldmann et al. | 280/152.1 |
| 6,435,533 | B1 | * | 8/2002 | Chuang | 280/152.1 |
| 6,446,994 | B1 | * | 9/2002 | Smerdon, Jr. | 280/152.1 |
| 6,474,667 | B1 | * | 11/2002 | Stocksmeier | 280/87.05 |
| 6,659,483 | B2 | * | 12/2003 | Blythe | 280/152.3 |

* cited by examiner

Primary Examiner—Hau Phan
(74) Attorney, Agent, or Firm—Troxell Law Office PLLC

(57) ABSTRACT

A fender structure for bicycles and particularly a fender structure installable by users and adaptable to various sizes of the bicycles according to users' requirements includes at least a front connecting plate located at the front end of a fender, a rear connecting plate located at the rear end of the fender, and at least one interconnecting plate located between the front connecting plate and the rear connecting plate. The connecting plates have respectively a front coupling section and a rear coupling section engageable with each other. Users may assemble and adjust the fender in various shapes, lengths, colors and angles according to their requirements. It may be retracted, assembled and detached easily, and has a great versatility and applicability.

7 Claims, 10 Drawing Sheets

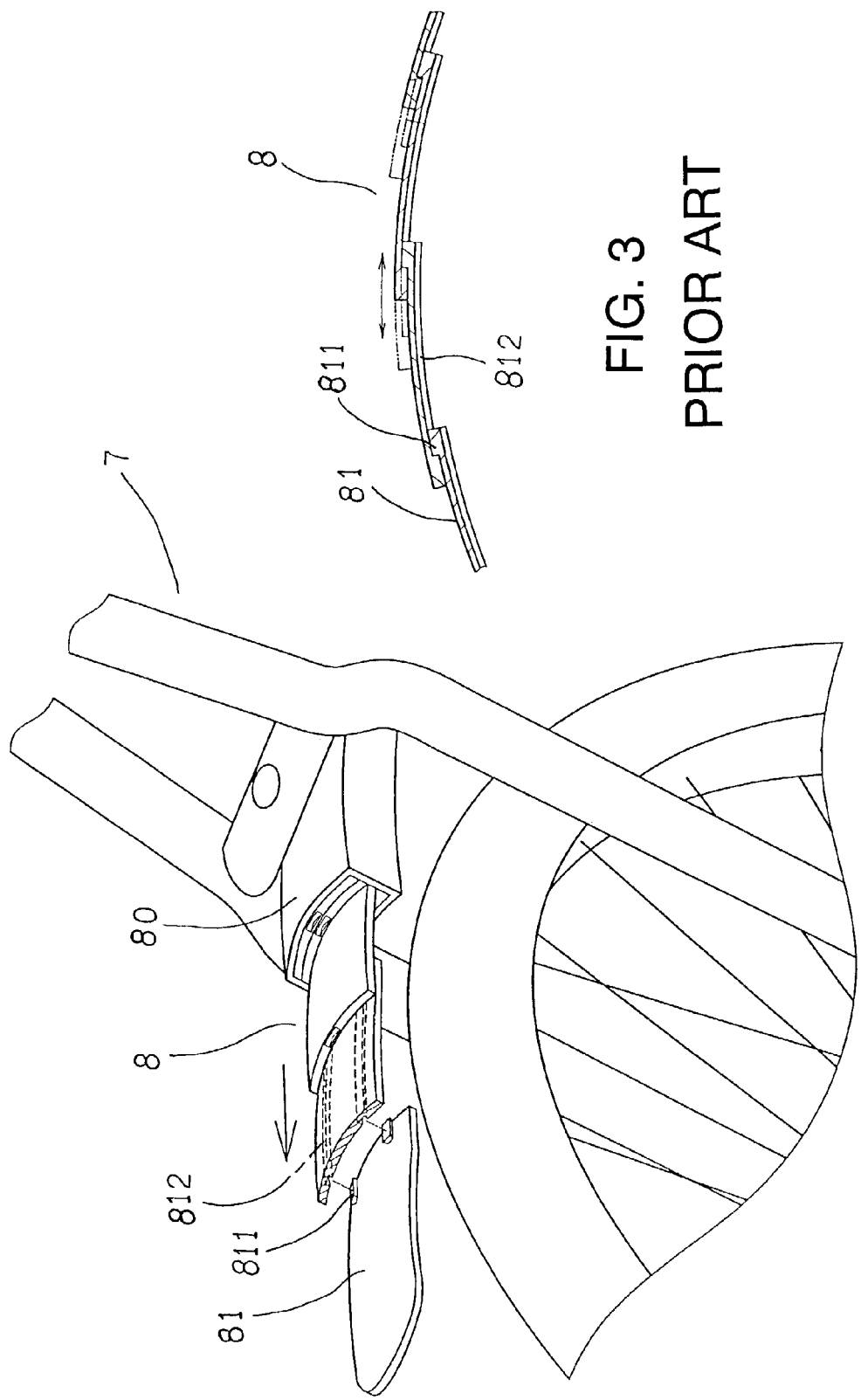

FENDER STRUCTURE FOR BICYCLES

BACKGROUND OF THE INVENTION

1. Field of the Invention

The invention relates to a fender structure for bicycles and particularly to a fender structure that is installable by users and adaptable to various sizes of the bicycles, and adjustable in shape, length, color and angle, and foldable and detachable, and is simple to assemble and install, and has a great versatility and applicability.

2. Description of the Prior Art

A conventional fender 71 (referring to FIG. 1) generally is made in an integrated plate which has a front section fastened to a stretcher 73 located on an upper side of the rear fork 72 of the bicycle 7 through a fastening plate 711 and a rear section fastened to a bracket 74 through a coupling blade 712. Such a structure is plainly designed and cannot be altered to suit the desire and requirements of individual. Moreover, it has the following drawbacks:

1. Different types and models of bicycles require different specifications of fenders. They are often not compatible. Hence producers have to prepare and stock many specifications of fenders to meet production requirements.
2. The conventional fenders are generally integrally made. When they are not in use and removal from the bicycle is wanted, they take a lot of space. Carrying and storage are inconvenient.

To remedy these problems, some venders have developed an extendable fender 8 as shown in FIGS. 2 and 3. While the extendable fender 8 can resolve the problems occurred to the conventional fenders, it still has shortcomings, notably:

1. The fender 8 has an arched plate 81 which has latch stubs 811 slidable in flutes 812 of another arched plate 81. The arched plates 81 do not have anchor structure. Thus the arched plates 81 tend to retract under vibration when the bicycle is ridden.
2. When the fender 8 is not in use and retracted, the arched plates 81 tend to slide out during riding.
3. When the fender 8 is retracted, the distal ends of the arched plates 81 are generally aligned to the tail end of a box 80. The arched plates 81 do not have gripping means for pulling out when in use. Pulling out operation takes a lot of efforts and is not convenient.
4. Such type of fender usually is made in a single specification, and cannot be adapted to bicycles of different specifications or wheels of different sizes. Moreover, the angle of the fender is not adjustable. It has limited applicability, and cannot be adapted universally.

SUMMARY OF THE INVENTION

The object of the invention is to provide a fender structure that is installable by users according to the size of bicycle and users' requirements. It includes at least a front connecting plate located at the front end of the fender and a rear connecting plate located at the rear end of the fender, and at least one interconnecting plate located between the front connecting plate and the rear connecting plate according to users' requirements. The plates at the front and rear side have respectively a front and a rear coupling section located at the front end and the rear send thereof to engage with each other. Thus users may assemble and install the fender as desired, and adjust the shape, length, color and angle of the fender. It can be retracted, assembled, disassembled and detached easily to provide a greater versatility and applicability.

The fender structure according to the invention includes at least a front connecting plate located at the front end of the fender and a rear connecting plate located at the rear end of the fender, and at least one interconnecting plate located between the front connecting plate and the rear connecting plate according to users' requirements. The plates at the front side and the rear sides have respectively a front and a rear coupling section located at the front end and the rear send thereof to engage with each other. The connecting plate at the front side has an arched coupling rim located at the rear end thereof that has a rear coupling section formed respectively on two outer sides (or inner sides). Each rear coupling section has a hole in the middle surrounding by an annular ratchet gear. The connecting plate at the rear side also has an arched coupling rim located at the front end that has a front coupling section formed respectively on two inner sides (or outer sides). Each front coupling section has a hole in the middle surrounding by an annular ratchet gear. The front coupling section of the rear connecting plate and the rear coupling section of the front connecting plate may be engaged with each other. A coupling member may be inserted into the holes to fasten the front connecting plate and the rear connecting plate tightly thereby to anchor the fender and achieve a firm installation.

According to one aspect of the invention, the connecting plate at the front side has a fastening section to couple with an adjusting dock mounted on the seat post.

In another aspect of the invention, the fender structure has at least two connecting plates to couple with each other in a front and rear fashion. One of the connecting plates has a connecting means to fasten to an external element (such as the front fork, fender bracket or the like).

The fender structure according to the invention enables users to assemble and install the fender as desired, and also allows users to adjust the shape, length, color and angle of the fender. It can be retracted, assembled, disassembled and detached easily to provide a greater versatility and applicability.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 2 is a schematic view of another conventional fender.

FIG. 3 is a fragmentary sectional view of another conventional fender.

DESCRIPTION OF THE PREFERRED EMBODIMENTS

First Embodiment

Figure 1:
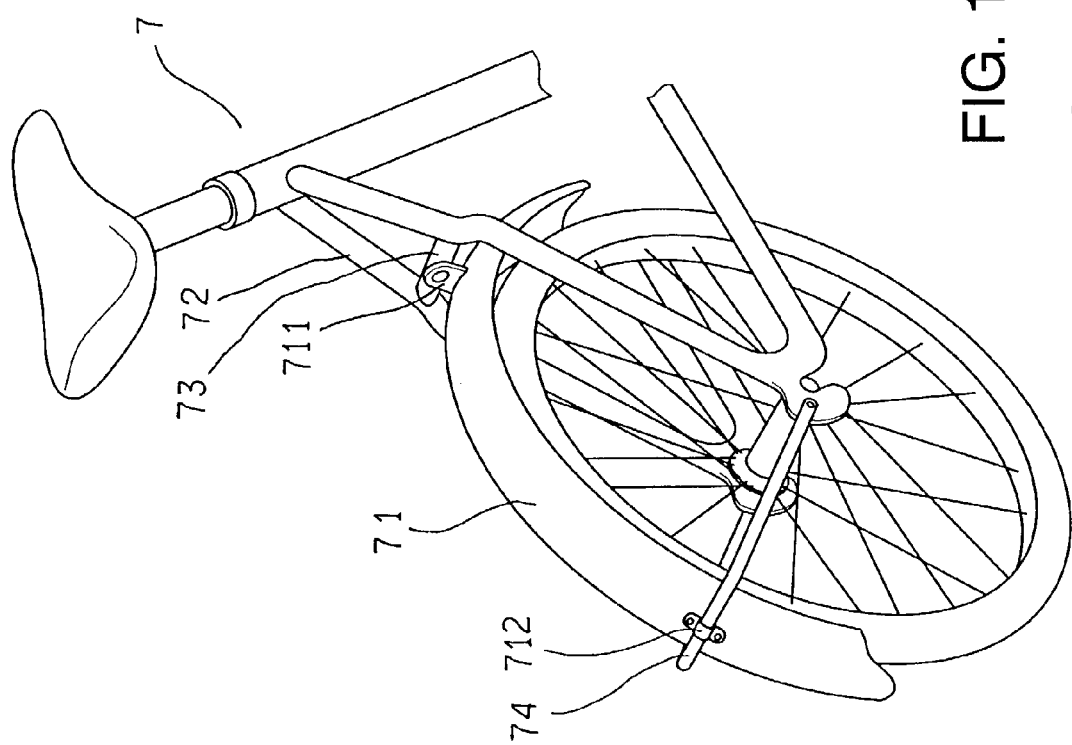
FIG. 1 is a schematic view of a conventional fender.
Figure 4:
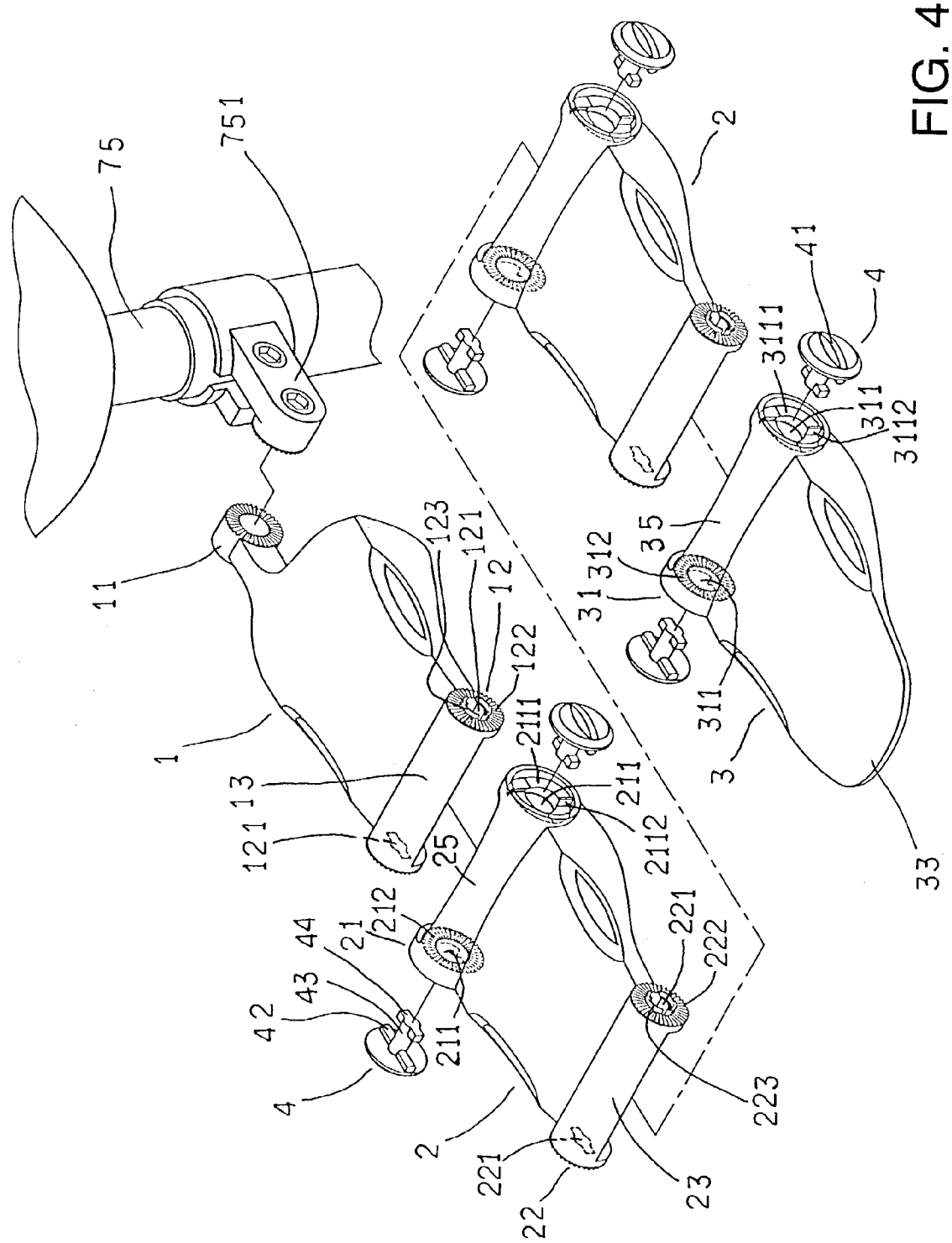
FIG. 4 is an exploded view of the invention.
Figure 5:
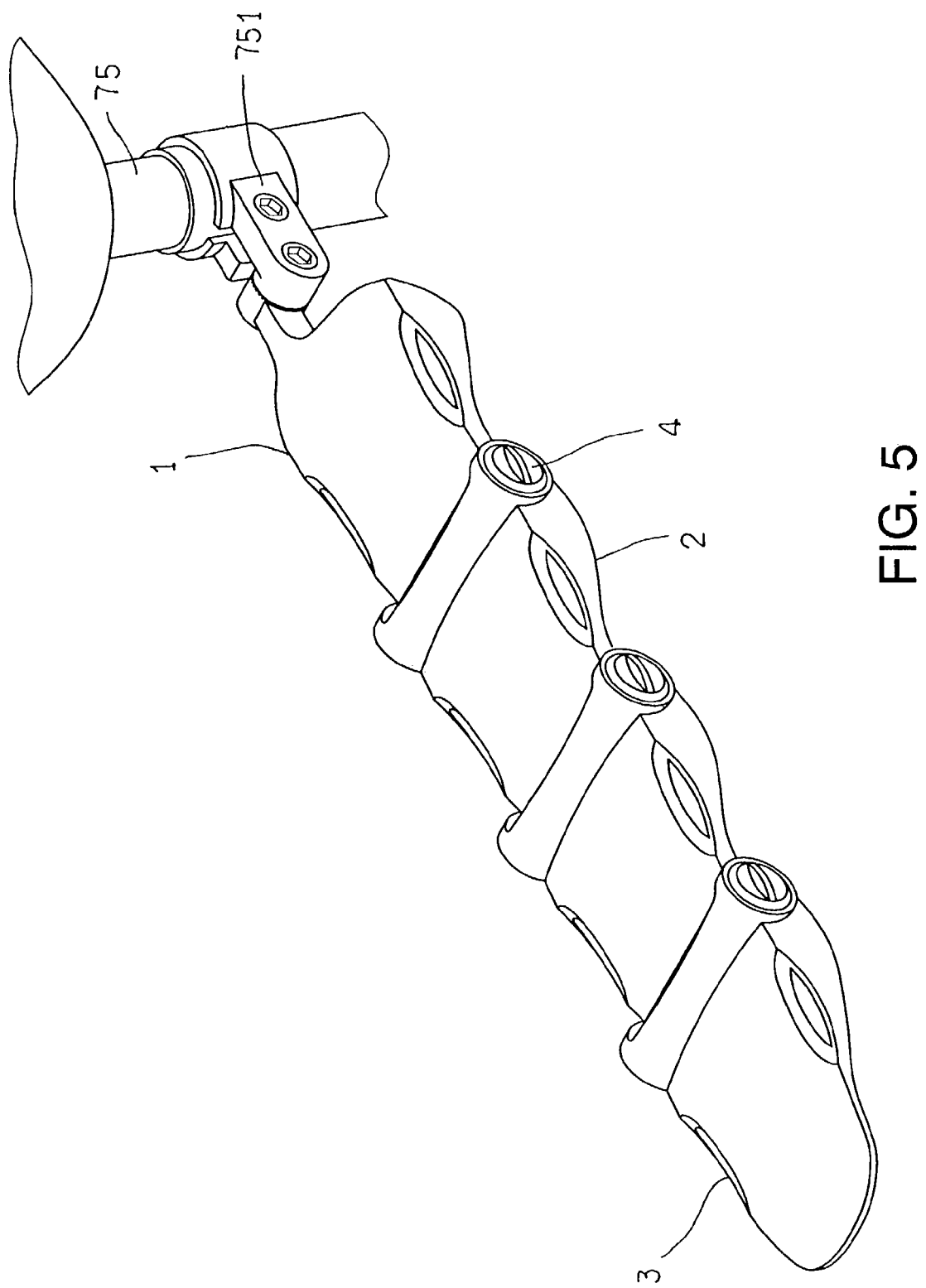
FIG. 5 is a perspective view of the invention.
Figure 6:
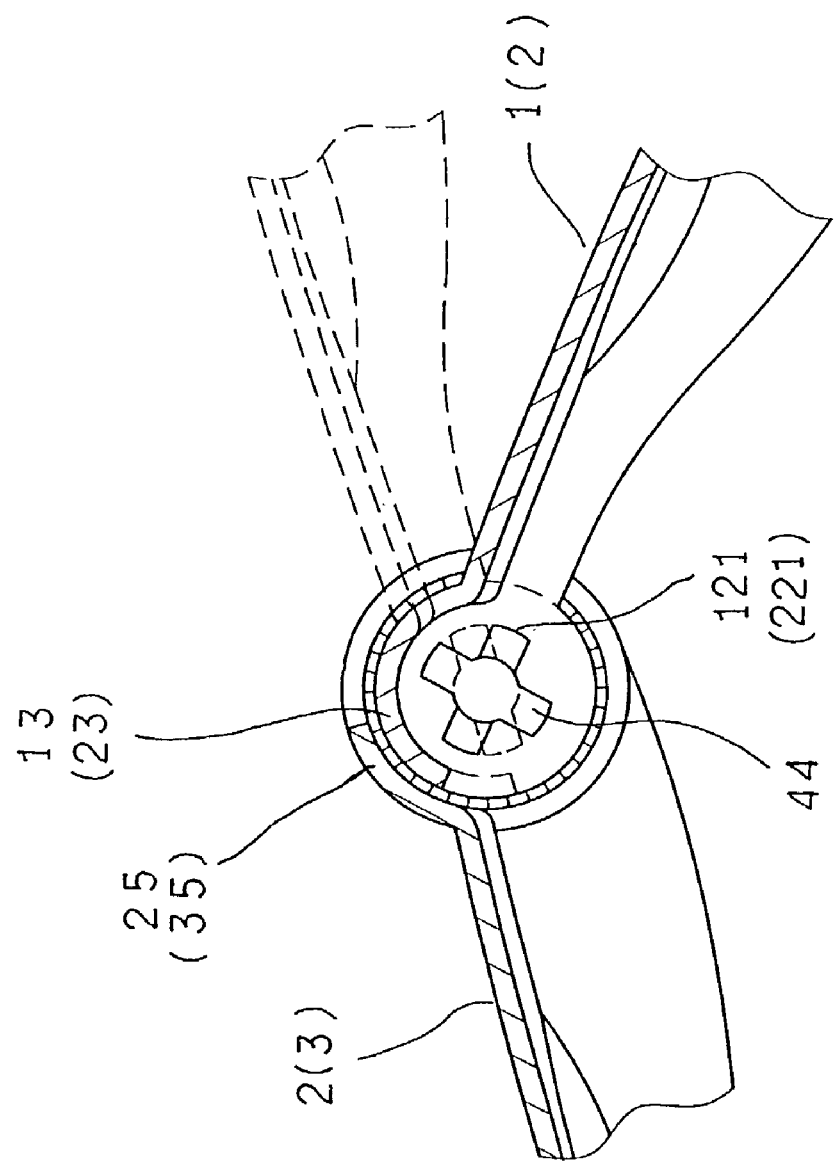
FIG. 6 is a schematic view of the invention showing the front and rear connecting plates in an adjusting condition.

Referring to FIG. 4, the fender structure of the invention includes at least a front connecting plate 1 located at the front end of the fender and a rear connecting plate 3 at the rear end of the fender. Between the front connecting plate 1 and the rear connecting plate 3, at least one interconnecting plate 2 may be disposed depending on user's requirements. The connecting plates 1, 2 and 3 have respectively a rear coupling section 12 or 22 to engage with a front coupling section 21 or 31 (as shown in FIG. 5). The rear coupling sections 12 and 22 are located respectively on two outer sides of a rear arched coupling rim 13 and 23. The rear coupling sections 12 and 22 have a hole 121 and 221 in the middle surrounding by a jutting rim 123 and 223 which forms an annular ratchet gear 122 and 222 on the outer periphery. The connecting plates 2 and 3 at the rear side have respectively a front arched coupling rim 25 and 35 at the front end which has two inner sides forming respectively the front coupling sections 21 and 31. The front coupling sections 21 and 31 have a hole 211 or 311 in the middle surrounding by an annular ratchet gear 212 and 312 on the outer periphery mating the annular ratchet gear 122 and 222. Thereby the connecting plates 1, 2 and 3 at the front side may be coupled with the rear side. The rear coupling rims 13 and 23 of the connecting plates 1 and 2 at the front side may be engaged with the front coupling rims 25 and 35 of the connecting plates 2 and 3 at the rear side, and the jutting rims 123 and 223 of the rear coupling sections 12 and 22 of the connecting plates 1 and 2 at the front side may engage with the holes 211 and 311 of the front coupling sections 21 and 31 of the connecting plates 2 and 3 at the rear side to form a turning axis. Moreover, the front and rear connecting plates 1, 2 and 3 may be connected and anchored with one another in a front and rear fashion. Coupling with the inter-engaging among the annular ratchet gears 122, 212, 222 and 312 (with the connecting plates made from plastics), when one of the connecting plates is bent under force, the engaging position and angle may be altered and adjusted (as shown in FIG. 6). In addition, the coupling rims 13 and 25 (23, 35) of the front and rear connecting plates 1 and 2 (2, 3) are designed to couple with each other in an inner side and outer side manner. Hence when the front and rear connecting plates 1, 2 and 3 are bent, the coupling rims 13, 25, 23 and 35 have sufficient area to overlap and cover each other so that no gaps are formed on the connecting portion to avoid affecting the fender function.

Figure 7:
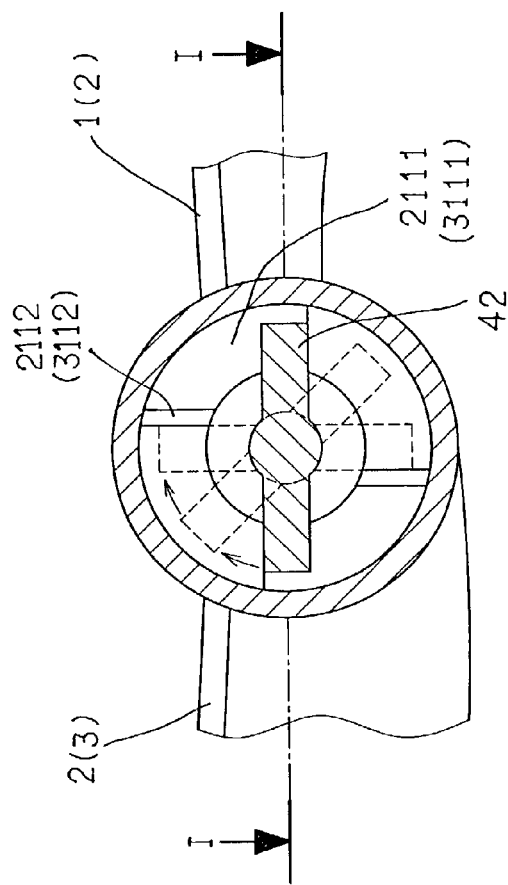
FIG. 7 is a schematic view of the invention showing the coupling member in a tightening operation.
Figure 9:
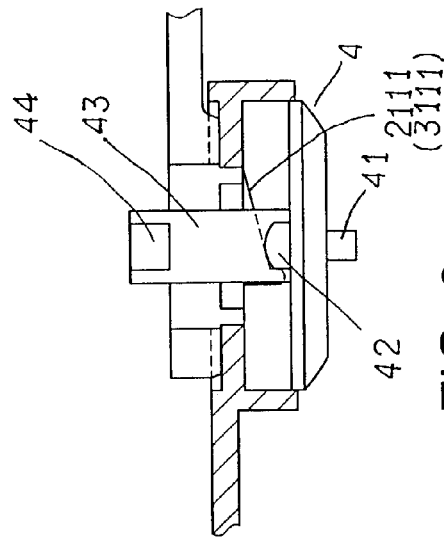
FIG. 9 is a schematic view of the invention showing the coupling member in another tightening operation.
Figure 8:
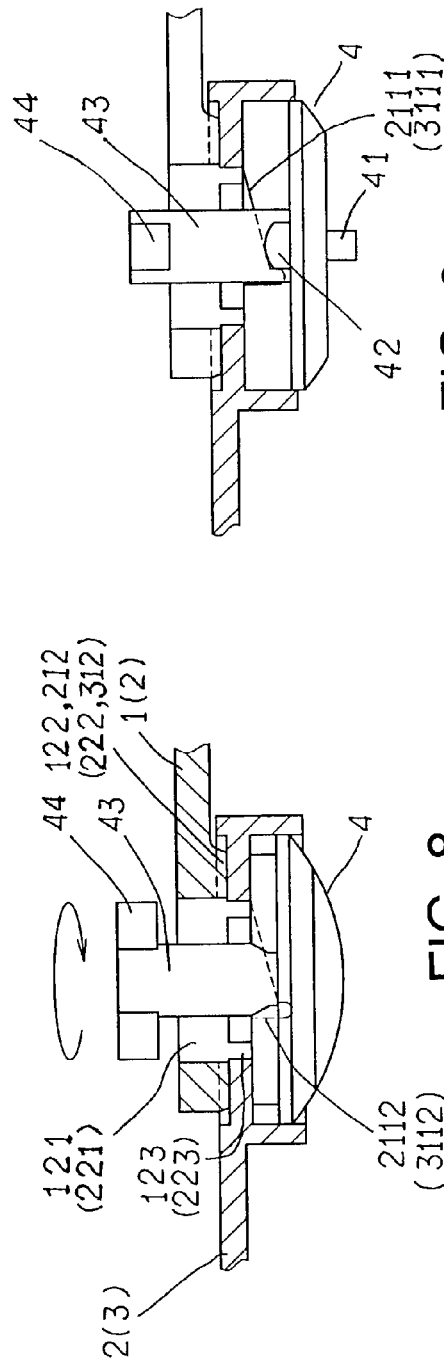
FIG. 8 is a cross section taken on line I—I in FIG. 7.

Furthermore, in order to enhance anchoring between the connecting plates, the rear coupling sections 12 and 22 of each connecting plate 1 and 2 have respectively a hole 121 and 221 formed in "—"—shape corresponding to the hole 211 and 311 on the front coupling sections 21 and 31 of the rear connecting plate 2 and 3. A coupling member 4 may be inserted into the holes from outside. The coupling member 4 has a handle 41 on one end and a latch rib 42 on an inner end that is symmetrical on the left and right side. The coupling member 4 further has a strut 43 extended in the center with one end forming two latch stubs 44 opposing each other. Hence when the coupling member 4 runs through the holes 211, 121, 311 and 221, the latch stubs 44 at the end of the strut 43 of the handle 41 may be inserted through the hole 121 and turned in a biased manner so that the latch stubs 44 may press the inner sides of the coupling sections 12 and 22 of the connecting plates 1 and 2 at the front, and the latch rub 42 press the outer sides of the holes 211 and 311 of the front coupling sections 21 and 31 of the connecting plates 2 and 3 at the rear side. The outer sides of the holes 211 and 311 of the connecting plates 2 and 3 at the rear side have sloped surfaces 2111 and 3111 corresponding to each other to achieve tightening effect. The highest locations of the sloped surfaces 2111 and 3111 have respectively a brake rib 2112 and 3112 to serve as the stopping spots of the coupling member 4 which runs though the holes 211, 121, 311 and 221 so that when the handle 41 is turned and tightened, the connecting plates may be anchored securely (as shown in FIGS. 7, 8 and 9).

To remove the coupling member 4, turn the handle 41 in the reverse direction to align the latch stubs 44 with the holes 121 and 221, then the coupling member 4 may be pulled out.

Furthermore, in order to facilitate fastening of the invention to the adjusting dock 751 on the bicycle seat post 75, the front connecting plate 1 of the fender may have a fastening section 11 at the front end to couple with the adjusting dock 751. In addition, to enhance the aesthetic appeal of the fender, the rear end 33 of the rear connecting plate 3 may be formed in an arched shape without the coupling section. To further improve the appeal of the fender, every connecting plate may be made in a different color to make the final assembly more attractive.

Figure 10:
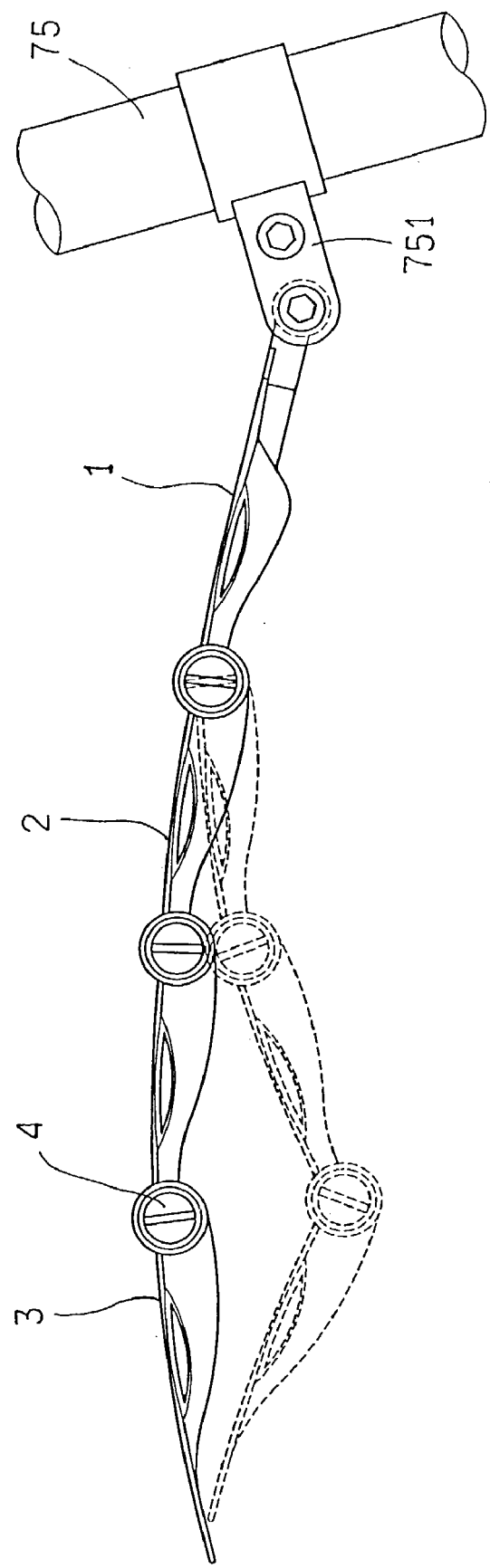
FIG. 10 is a schematic view of the invention showing an adjusted shape and angle.

As the invention consists of a plurality of connecting plates 1, 2 and 3, the number of the connecting plates may be increased or decreased based on the size of the bicycles and user's requirements. In addition, the shape and angle of the fender may be adjusted (as shown in FIG. 10). To make the adjustment, first, turn and loosen the coupling member, and adjust the fender to a desired position; then tighten the coupling member 4 to anchor the fender. Thus applicability of the invention may be greatly enhanced.

Second Embodiment

Figure 11:
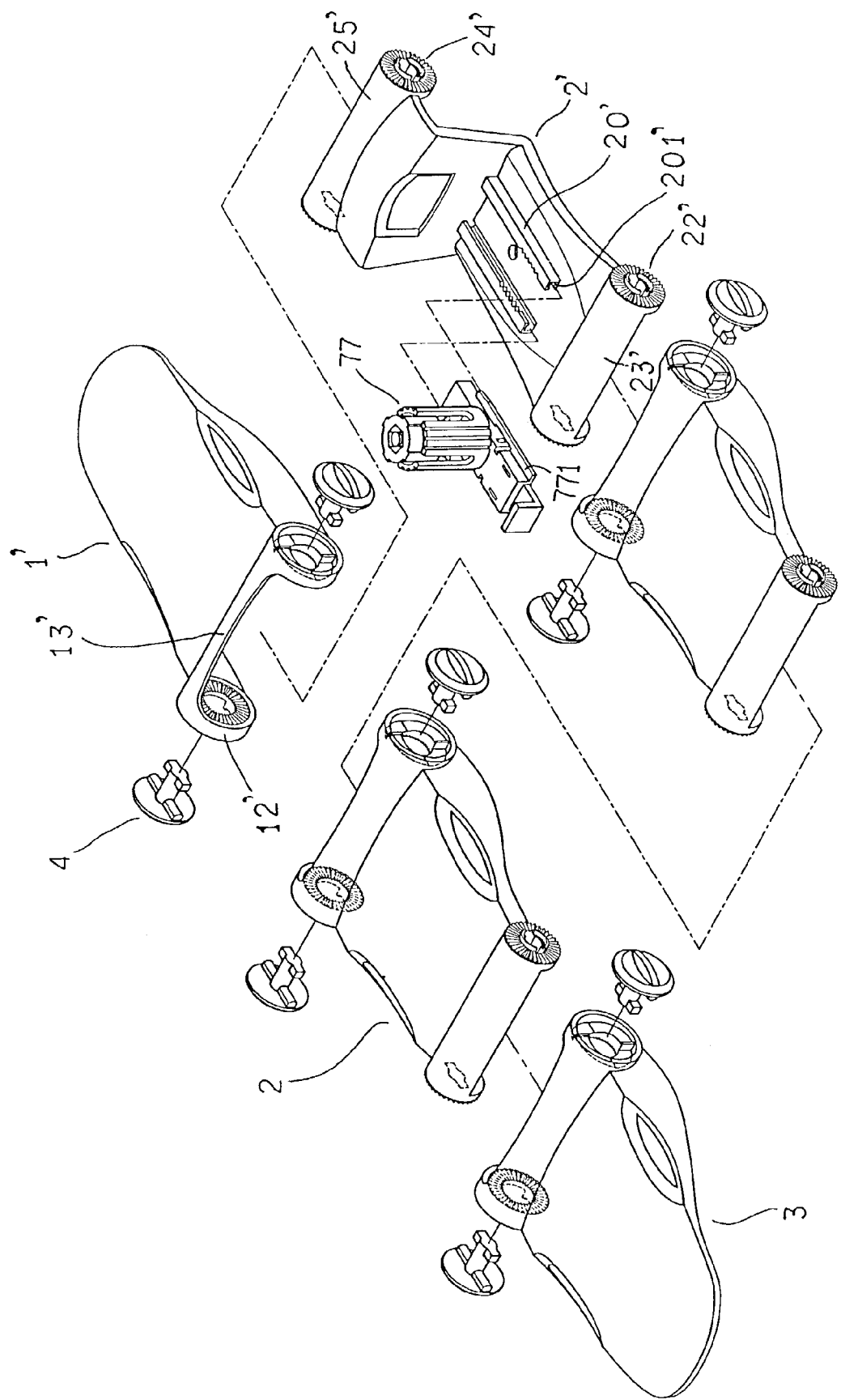
FIG. 11 is an exploded view of another embodiment of the invention.
Figure 12:
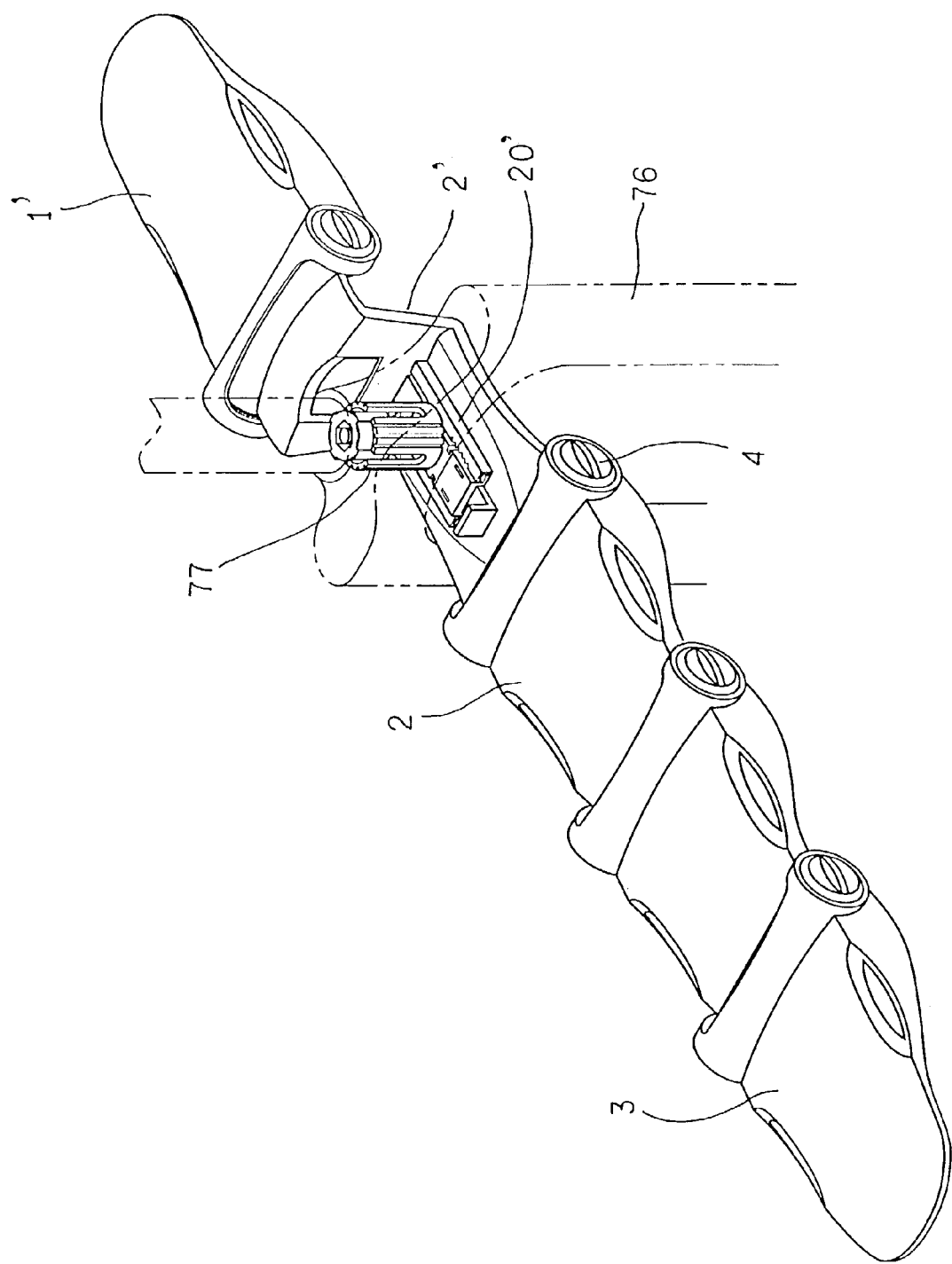
FIG. 12 is a perspective view of another embodiment of the invention.
Figure 13:
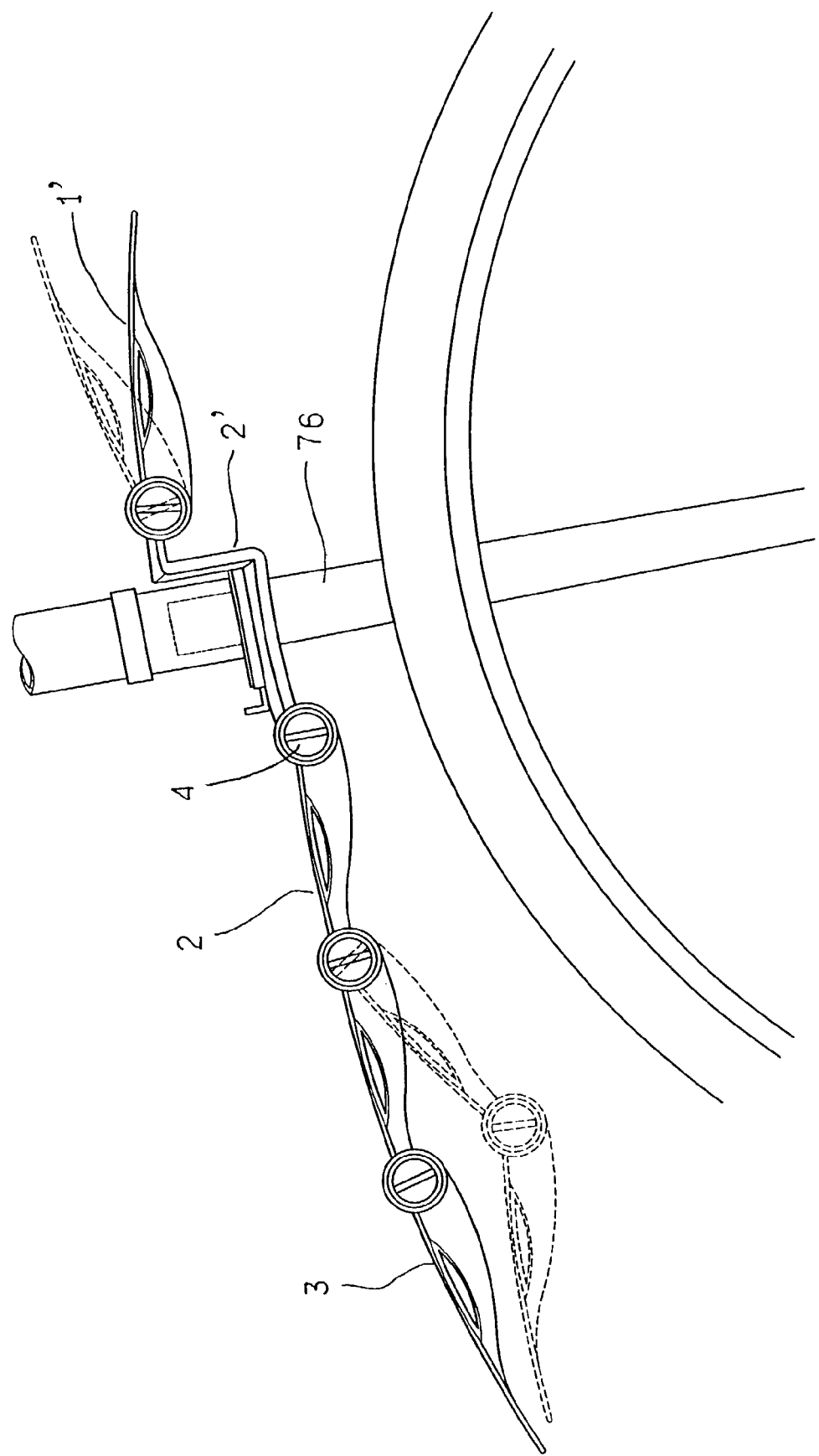
FIG. 13 a schematic view of another embodiment of the invention showing an adjusted shape and angle.

Refer to FIG. 11 for a second embodiment of the invention. In order to make the invention more adaptable for use on the front fork, one of the connecting plates 2' (preferably the second connecting plate) may be coupled with a connecting means 20' to fasten to an external object (such as the front fork or fender bracket). Taking the front fork as an example, to couple with the front fork 76, the connecting plate 2' is formed in L-shape with the connecting means 20' located thereon. The connecting means 20' serves to fasten to the front fork 76. The connecting means may be made in many forms. FIG. 11 illustrates one of the examples. The connecting means 20' includes two parallel guiding channels 201'. The front fork 76 has a connecting dock 77 which has two side flanges 771 for wedging in the guiding channel 201' to accomplish positioning and anchoring (as shown in FIGS. 12 and 13). The rear coupling section 12' at the rear coupling rim 13' of the front connecting plate 1' and the front and rear coupling sections 24' and 22' of the front and rear coupling rims 25' and 23' of the connecting plate 2' are constructed same as the ones described in the first embodiment. In addition, the invention may also be adopted to connect other bicycles accessories such as fender brackets, reflectors, and the like. Basically the connecting structure of the front and rear connecting plates of the invention serves as the main assembly body of the fender to couple with other accessories desired.

In summary, the invention offers at least the following advantages:
1. The invention may be assembled and installed by users according to the size of the bicycles and requirements of users.
2. The shape, length, color and angle of the fender may be assembled and adjusted to suit user's desire.
3. The invention may be disassembled, folded and stored easily and does not take much space.
4. The invention is versatile and universally applicable, and may be adapted to a wide variety of bicycle types, and is easy to assemble and install.

I claim:

1. A fender structure for bicycles, comprising at least:
   a front connecting plate located at a front end of a fender having a rear end which has a rear coupling rim with two sides formed respectively a rear coupling section; and
   a rear connecting plate located at a rear end of the fender having a front end which has a front coupling rim with two sides formed respectively a front coupling section;
   wherein the rear coupling section of the front connecting plate is coupled and engaged with the front coupling section of the rear connecting plate to facilitate assembling, installing and adjusting operations of the fender, wherein the rear coupling section of the front connecting plate has a front annular ratchet gear formed on an outer side thereof that has a first hole in the center, the fornt coupling section of the rear connecting plate having a rear annular ratchet gear formed on an inner side thereof that has a second hole in the center, the front annular ratchet gear being corresponded to the rear annular ratchet gear, and the first hole and the second hole being insertable by a coupling member.

2. The fender structure for bicycles of claim 1 wherein the couple member has one end which has a surface forming a handle and an inner end having a latching rib symmetrical in a left and right fashion, and a strut extending in the center, the strut having a distal end which has two latch stubs opposing each other.

3. The fender structure for bicycles of claim 1, wherein the first hole on the rear coupling section of the front connecting plate is surrounding by a jutting rim to couple with the second hole on the front coupling section of the rear connecting plate to form a turning axis.

4. The fender structure for bicycles of claim 1, wherein the second hole of the front coupling section has two corresponding sloped surfaces extending from a lower location to a higher location on the periphery thereof, each of the slope surfaces having a distal end which has a brake rib located thereon.

5. A fender structure for bicycles, comprising at least:
   a front connecting plate located at a front end of a fender having a rear end which has a rear coupling rim with two sides formed respectively a rear coupling section; and
   a rear connecting plate located at a rear end of the fender having a front end which has a front coupling rim with two sides formed respectively a front coupling section;
   at least two interconnecting plates including first and second interconnecting plates, the first interconnecting plate having a first front coupling rim located on a front end thereof with two front coupling sections located on two sides and coupled to the rear coupling rim of the front connecting plate, said first interconnecting plate includes a rear coupling rim at a rear end thereof with two rear coupling sections located on two sides and coupled to a first front coupling rim having two coupling sections located on two sides of a front end of the second interconnecting plate, said second interconnecting plate includes a rear coupling rim at a rear end thereof with two rear coupling sections located on two sides coupled the front coupling rim of the rear connecting plate, wherein the second interconnecting plate is located behind the first interconnecting plate,
   wherein the rear coupling section of the connecting plate at the front side of the fender has a front annular ratchet gear formed on an outer side thereof that has a first hole in the center, the front coupling section of the connecting plate at the rear side of the fender having a rear annular ratchet gear formed on an inner side therof that has a second hole in the center, the first hole and the second hole being insertable by a coupling member.

6. The fender structure for bicycles of claim 5, wherein the first hole on the rear coupling section of the connecting plate at the front side is surrounded by a jutting rim to couple with the second hole on the front coupling section of the connecting plate at the rear side to form a turning axis.

7. The fender structure for bicycles of claim 5, wherein the second hole of the front coupling section has two corresponding sloped surfaces extended from a lower location to a higher location on the periphery thereof, each of the slope surfaces having a distal end which has a brake rib located thereon.

* * * * *